(12) United States Patent
Jeong et al.

(10) Patent No.: US 6,902,634 B2
(45) Date of Patent: *Jun. 7, 2005

(54) METHOD FOR MANUFACTURING ZIRCONIUM-BASED ALLOYS CONTAINING NIOBIUM FOR USE IN NUCLEAR FUEL ROD CLADDING

(75) Inventors: Yong Hwan Jeong, Daejeon (KR); Jong Hyuk Baek, Daejeon (KR); Byoung Kwon Choi, Daejeon (KR); Sang Yoon Park, Daejeon (KR); Myung Ho Lee, Daejeon (KR); Cheol Nam, Daejeon (KR); Jeong Yong Park, Daejeon (KR); Youn Ho Jung, Daejeon (KR)

(73) Assignees: Korea Atomic Energy Research Institute, Daejeon (KR); Korea Hydro & Nuclear Power Co., Ltd., Seoul (KR)

(*) Notice: Subject to any disclaimer, the term of this patent is extended or adjusted under 35 U.S.C. 154(b) by 368 days.

This patent is subject to a terminal disclaimer.

(21) Appl. No.: 10/193,494

(22) Filed: Jul. 9, 2002

(65) Prior Publication Data

US 2003/0098105 A1 May 29, 2003

(30) Foreign Application Priority Data

Nov. 2, 2001 (KR) ......................... 2001-68244

(51) Int. Cl.[7] .................................. C22F 1/18
(52) U.S. Cl. ....................... 148/557; 148/672
(58) Field of Search .................................. 148/557, 672

(56) References Cited

U.S. PATENT DOCUMENTS

| 4,678,521 A | * | 7/1987 | Yoshida et al. ............. 148/672 |
| 5,225,154 A | * | 7/1993 | Kanno et al. ............... 376/416 |
| 5,838,753 A | | 11/1998 | Van Swam et al. |
| 6,125,161 A | * | 9/2000 | Isobe et al. ................. 376/410 |
| 6,514,360 B2 | * | 2/2003 | Jeong et al. ................ 148/668 |
| 6,811,746 B2 | * | 11/2004 | Jeong et al. ................ 420/422 |
| 2003/0044306 A1 | * | 3/2003 | Jeong et al. ................ 420/422 |

FOREIGN PATENT DOCUMENTS

| WO | WO 01/24193 | 4/2001 |
| WO | WO 01/24194 | 4/2001 |
| WO | WO 01/61062 | 8/2001 |

* cited by examiner

Primary Examiner—George Wyszomierski
(74) Attorney, Agent, or Firm—Bachman & LaPointe, P.C.

(57) ABSTRACT

The present invention relates to a method for manufacturing zirconium-based alloys containing niobium with superior corrosion resistance for use in nuclear fuel rod claddings. The method of this invention comprises melting of the alloy, β-forging, β-quenching, hot-working, vacuum annealing, cold-working, intermediate annealing and final annealing, whereby the niobium concentration in the α-Zr matrix decreases from the supersaturation state to the equilibrium state to improve the corrosion resistance of the alloy. Such zirconium-based alloys containing niobium are usefully applied to nuclear fuel rod cladding of the cores in light water reactors and heavy water reactors.

24 Claims, 3 Drawing Sheets

METHOD FOR MANUFACTURING ZIRCONIUM-BASED ALLOYS CONTAINING NIOBIUM FOR USE IN NUCLEAR FUEL ROD CLADDING

BACKGROUND OF THE INVENTION

1. Field of the Invention

The present invention relates to a method for manufacturing zirconium-based alloys containing niobium for use in nuclear fuel rod cladding, wherein the manufactured alloy exhibits improved corrosion resistance.

2. Discussion of the Related Art

In the past, zirconium alloys have been widely applied to nuclear reactors, such as light water reactors and heavy water reactors. Such applications include nuclear fuel rod cladding, space grids, and reactor core components. Among zirconium alloys thus-far developed, Zircaloy-2 and Zircaloy-4 have been widely utilized. Here, Zircaloy-2 is comprised of 1.20–1.70 wt % of tin (Sn), 0.07–0.20 wt % of iron (Fe), 0.05–1.15 wt % of chromium (Cr), 0.03–0.08 wt % of nickel (Ni), 900–1500 ppm of oxygen (O), and the balance of zirconium (Zr); and zircaloy-4 is comprised of 1.20–1.70 wt % of tin, 0.18–0.24 wt % of iron, 0.07–1.13 wt % of chromium, less than 0.07 wt % of nickel, 900–1500 ppm of oxygen, and the balance of zirconium.

As the operating condition of nuclear power plants tends to be at high burnup, increased operating temperature, and high pH, Zircaloy-2 and Zircaloy-4 could not be utilized as nuclear fuel rod cladding. Recently, an extensive and successful research and development have been focused on increasing the corrosion resistance of zirconium-based alloys. A notable feature of the zirconium-based alloy developed in this manner is that the nuclear fuel rod cladding contains niobium to improve corrosion resistance.

The corrosion resistance of the zirconium-based alloy containing niobium depends on the alloying element, the size of precipitate in microstructure and the annealing condition. Particularly, the corrosion resistance of the zirconium-based alloy containing more than 1.0 wt % of niobium changes sensitively in the variation of niobium contents and annealing temperature. Therefore, to manufacture zirconium-based alloy containing niobium with superior corrosion resistance for use in nuclear fuel rod cladding, above all things, it is very important to establish an optimal manufacturing method.

The prior art related to the method for manufacturing Nb-containing zirconium alloys for use in nuclear fuel cladding tubes, space grids, and reactor core components is as following.

U.S. Pat. No. 5,838,753, EP Patent No. 895,247, 910,098, and 1,111,623, and JP Patent No. 11,109,072 disclose a method for manufacturing zirconium alloy comprising Nb (0.5–3.25 wt %) and Sn (0.3–1.8 wt %) for use in cladding tubes of high burn-up nuclear fuels. The method comprises heating the zirconium alloy billet at β range temperature above 950° C. and rapidly quenching the heated billet below a transformation temperature from (α+β) to α to form a martensitic structure; extruding the quenched billet below 600° C. to form a hollow billet; annealing the extruded billet below 590° C.; cold-working the annealed billet; and intermediate annealing to form nuclear fuel cladding tubes. As such, the nuclear fuel rod cladding tube has a microstructure in which second phase precipitates of β-Nb are distributed uniformly, intragranularly and intergranularly in the alloy matrix, thereby having a microstructure with excellent stability when irradiated by neutron.

WO Patent No. 2001-061062 discloses a method for manufacturing a nuclear fuel cladding tube comprising a low content of Sn and 0.60–2 wt % of Nb. Sn/Fe ratio is 0.25/0.5, 0.4/(0.35–0.5) or 0.5/(0.25–0.5). More than 0.75 wt % of Fe+Sn is added to the nuclear fuel cladding tube. The method is composed of vacuum melting, forging, and hot- and cold-rolling, followed by annealing. The thus-obtained alloy has β-Nb of small size and Zr—Nb—Fe precipitates uniformly distributed in the zirconium matrix.

JP Patent No. 2001-208879 discloses a nuclear fuel assembly composition comprising a welding part, wherein a zirconium alloy or a zircaloy alloy comprising 0.2–1.5 wt % of Nb is treated at a temperature of 400–620° C. to increase the corrosion resistance of the welding part.

WO Patent Nos. 2001-024193 and 2001-024194 disclose a zirconium alloy for reactor core components. The zirconium alloy comprises 0.02–1 wt % of Fe, 0.8–2.3 wt % of Nb, 2000 ppm or less of Sn, 2000 ppm or less of O, 5–35 ppm of S, and 0.25 wt % or less of Cr+V.

JP Patent No. 01-1158591 discloses a method for manufacturing zirconium alloy for a structure of reactor core or nuclear fuel cladding tube. The method consists of β-quenching, hot-working, cold-working, intermediate heat-treatment, final cold-working, and final annealing. At least one heat-treatment should comprise heating the zirconium alloy to above 750° C., and cooling it to 500° C. at a rate of about 40° C./s. Final annealing is then performed at 450–500° C.

JP Patent No. 06-049608 discloses a method for manufacturing zirconium alloy plate comprising steps of performing a solution heat-treatment, hot-working, heat-treatment, cold-working, and final annealing. The intermediate heat-treatment between the repeated cold-workings is performed once or several times so that the accumulated annealing parameter is limited to a range of $3 \times 10^{-18}$ to $2 \times 10^{-16}$. The temperature for hot-working is 700–800° C. and the annealing temperature is 400–650° C.

JP Patent No. 04-329855 discloses a method for manufacturing zirconium alloy comprising steps of melting Zr-2.5 wt % Nb alloy component, performing a solution heat-treatment at 870° C. for thirty minutes, water cooling, cold-working at a working percentage of 3.9%, and annealing at 500° C. for 24 hours. When the (α+β) type zirconium alloy is manufactured by a method comprising steps of performing a solution heat-treatment, cold-working at a working percentage of 1–5%, and annealing, the zirconium alloy exhibits high corrosion resistance and creep resistance.

JP Patent No. 63-050453 discloses a method for manufacturing zirconium alloy comprising steps of solution heat-treating a zirconium alloy comprising Nb, Sn, and Mo, cooling from (α+β) phase range or β phase range, cold-working, heating to a temperature higher than eutectoid temperature, cooling again, and annealing at α phase range lower than eutectoid temperature. The thus-obtained zirconium alloy exhibits properties of high strength and high corrosion resistance.

JP Patent No. 62-182258 discloses a method for manufacturing zirconium alloy comprising steps of solution heat-treating the zirconium alloy comprising 0.2–5 wt % of Nb, 0.5–3 wt % of Sn, 0.1–2 wt % of Fe, and 500–2000 ppm of O, at (α+β) phase range or β phase range; rapid cooling at a high rate; cold-working at an extrusion percentage above 15%; and annealing at a temperature higher than recrystallization temperature at the α phase range. The thus-obtained zirconium alloy exhibits excellent ductility and corrosion resistance. Also, the zirconium alloy comprising 2.5 wt % of Nb, 1.0 wt % of Sn, 0.15 wt % of Fe, and 1210 ppm of O is prepared as a 9 mm thick cold-rolled plate by a method which comprises heating at 940° C. for thirty minutes, water cooling, cold-working with a extrusion percentage of 40%, and annealing at 400° C. for twenty minutes. The alloy exhibits similar mechanical properties as that of the zirconium alloy comprising 2.5 wt % of Nb and 1230 ppm of O.

As described above with respect to the prior art, research has been carried out on conventional zirconium-based alloy containing niobium for use in nuclear fuel cladding tubes, to impart high corrosion resistance by changing the type and amount of elements to be added.

SUMMARY OF THE INVENTION

Leading to the present invention, we developed an optimized method for manufacturing zirconium-based alloy containing niobium exhibiting improved corrosion resistance which depends on the size and type of precipitate, an accumulated annealing parameter, and niobium concentration in the $\alpha$-Zr matrix.

It is the objective of this invention to provide a method for manufacturing zirconium-based alloy containing niobium for use in nuclear fuel rod cladding tubes.

In order to attain the above objective, the present invention provides a method for manufacturing zirconium-based alloy containing niobium comprising steps of:

melting an ingot of the alloy component;

forging the ingot at a $\beta$ phase temperature above 1000° C.;

$\beta$-quenching the forged ingot in water after performing a solution heat-treatment at $\beta$ phase range of 1000° C.;

hot-working the $\beta$ quenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum; and final-annealing the cold-worked ingot at a temperature of 470–580° C., whereby the niobium concentration in the $\alpha$-Zr matrix decreases from the supersaturation state to the equilibrium state.

As a first aspect, the present invention provides a method for manufacturing a zirconium-based alloy for use in nuclear fuel cladding tubes, comprising 1.1–1.7 wt % of niobium (Nb); 600–1600 ppm of oxygen (O); 80–120 ppm of silicon (Si), and the balance of zirconium (Zr).

As a second aspect, the present invention provides a method for manufacturing a zirconium-based alloy for use in nuclear fuel cladding tubes, comprising 1.1–1.7 wt % of niobium; 0.01–0.15 wt % of copper (Cu); 600–1600 ppm of oxygen; 80–120 ppm of silicon, and the balance of zirconium.

As a third aspect, the present invention provides a method for manufacturing a zirconium-based alloy for use in nuclear fuel cladding tubes, comprising 1.1–1.7 wt % of niobium; 0.3–0.7 wt % of tin (Sn); 600–1600 ppm of oxygen; 80–120 ppm of silicon, and the balance of zirconium.

As a fourth aspect, the present invention provides a method for manufacturing a zirconium-based alloy for use in nuclear fuel cladding tubes, comprising 1.1–1.7 wt % of niobium; 0.3–0.7 wt % of tin; 0.05–0.4 wt % of iron (Fe); 600–1600 ppm of oxygen; 80–120 ppm of silicon, and the balance of zirconium.

As a fifth aspect, the present invention provides a method for manufacturing a zirconium-based alloy for use in nuclear fuel cladding tubes, comprising 1.1–1.7 wt % of niobium; 0.3–0.7 wt % of tin; 0.05–0.4 wt % of iron; 0.05–0.2 wt % of chromium; 600–1600 ppm of oxygen; 80–120 ppm of silicon, and the balance of zirconium.

As a sixth aspect, the present invention provides a method for manufacturing a zirconium-based alloy for use in nuclear fuel cladding tubes, comprising 1.1–1.7 wt % of niobium; 0.3–0.7 wt % of tin; 0.05–0.4 wt % of iron; 0.05–0.2 wt % of copper; 600–1600 ppm of oxygen; 80–120 ppm of silicon, and the balance of zirconium.

BRIEF DESCRIPTION OF THE DRAWINGS

The above and other objects, features and other advantages of the present invention will be more clearly understood from the following detailed description taken in conjunction with the accompanying drawings in which.

DETAILED DESCRIPTION OF THE INVENTION

The zirconium-based alloy of the present invention is manufactured by a method comprising the steps of (a) melting an ingot of the alloy component; (b) forging the ingot at a $\beta$ phase temperature above 1000° C.; (c) $\beta$-quenching the forged ingot in water after performing a solution heat-treatment at $\beta$ phase range of 1000° C.; (d) hot-working the $\beta$ quenched ingot at a temperature of 600–640° C.; (e) vacuum annealing the hot-worked ingot at 570–610° C.; (f) cold-working the annealed ingot in three to four passes, with an intermediate annealing step performed between each pass, wherein the intermediate annealing step is performed at a temperature of 570–610° C. in a vacuum; and (g) final annealing the cold-worked ingot at a temperature of 470–580° C.

According to the method of the present invention, the concentration of niobium in the $\alpha$-Zr matrix decreases from the supersaturation state to the equilibrium state which is maintained at operation temperature of nuclear reactor. As a result, corrosion resistance can be improved.

In step (a), alloy elements such as Nb, Sn, Fe, Cr, Cu, O, and Si are mixed with Zr and then melted. All of the constituents of the Zr-alloy of the present invention are melted by vacuum arc remelting (VAR) method.

In step (b), an ingot is forged at $\beta$ phase range above 1000° C. to break its dendrite structure. The forging temperature is preferably 1100–1200° C.

In step (c), solution heat-treatment of the ingot is preformed at β phase range above 1000° C. so that the alloy composition may become homogeneous, and then is quenched to yield a martensite structure or widmanstatten structure. This step is carried out for homogenizing the composition and controlling the particle sizes of precipitates in the alloy matrix. The solution heat-treatment temperature is preferably β phase range of 1050–1100° C., and the cooling is performed from β phase range to below 400° C. at a cooling rate greater than 300° C./s.

In step (d), the β-quenched ingot is worked into a hollow billet and hot-worked to prepare an extruded bar, which is suitable for cold working. At this time, the heat treatment temperature is preferably 600–640° C., more preferably 630° C.

In step (e), the hot-worked ingot is heat-treated at 570–610° C., and preferably at 580° C., for three hours.

In step (f), the extruded bar of step (e) is cold-worked to form a nuclear fuel cladding tube (the final size has an outside diameter of 9.5 mm and a thickness of 0.57 mm). Then, it is heat-treated in the intermediate vacuum annealing steps between each cold-working step so as to prepare recrystallized structure, to attain small β-Nb precipitates which are distributed uniformly, and for the concentration of Nb to reach equilibrium concentration. The intermediate heat-treatment temperature is 570–610° C. and its duration is generally 30–100 hours. On the other hand, increasing manufacturing efficiency, the extruded bar is cold-worked only for three times to manufacture nuclear fuel cladding tube of final size. At this time, the intermediate annealing temperature is 580° C., to control the condition under which the concentration of niobium in the α-Zr matrix becomes equilibrium concentration, and the heat-treatment duration is generally 3 to 10 hours.

In step (g), the nuclear fuel cladding tube prepared as final size is final annealed under vacuum and the zirconium alloy of the present invention is final annealed at 470–580° C. for 3 hours.

The zirconium alloy of the present invention is heat-treated for a long duration to make the Nb concentration in the α-Zr matrix reach equilibrium concentration, but since the size of precipitates may increase at this case, the heat-treatment duration and temperature are controlled so that the maximum size of precipitates is limited and the average size of precipitates does not increase.

As such, an accumulated annealing parameter $\Sigma A$ is preferably limited to less than $1 \times 10^{-18}$ hours, so that the average size of precipitates does not excess 80 nm. Here, the value of $\Sigma A$ is defined by the following equation:

$$\Sigma A = \Sigma t_i \exp(-Q/RT_1) \qquad \text{(Equation 1)}$$

wherein, ti is the annealing time of the i-th step after β-quenching, $T_1$ is the annealing temperature of the i-th step after β-quenching, Q is an activation energy, and Q/R is equal to 4000K.

According to the respective embodiments of the present invention, the zirconium-based alloy containing niobium of present invention comprises:

1.5 wt % of Nb, 1200 ppm of O, and 100 ppm of Si, and the balance of zirconium;

1.2 wt % of Nb, 0.1 wt % of Cu, 1200 ppm of O, and 100 ppm of Si, and the balance of zirconium;

1.5 wt % of Nb, 0.4 wt % of Sn, 1200 ppm of O, 100 ppm of Si, and the balance of zirconium;

1.5 wt % of Nb, 0.4 wt % of Sn, 0.2 wt % of Fe, 1200 ppm of O, 100 ppm of Si, and the balance of zirconium;

1.5 wt % of Nb, 0.4 wt % of Sn, 0.2 wt % of Fe, 0.1 wt % of Cr, 1200 ppm of O, 100 ppm of Si, and the balance of zirconium; or 1.5 wt % of Nb, 0.4 wt % of Sn, 0.1 wt % of Fe, 0.1 wt % of Cu, 1200 ppm of O, 100 ppm of Si, and the balance of zirconium.

In each embodiment, the concentration of niobium in the α-Zr matrix decreases from the supersaturation state to the equilibrium state which is maintained at operation temperature of nuclear reactor. As a result, corrosion resistance can be improved.

A better understanding of the present invention may be obtained in the light of the following examples which are set forth to illustrate, but not to limit, the present invention.

EXAMPLE 1

Preparation of Zirconium Alloy 1

Thirty kinds of zirconium alloys in total according to the present invention have been described, hereinafter. The manufacturing process and the preferred embodiments, also, have been described.

The alloy elements such as Nb, Sn, Fe, Cr, Cu, O and Si shown in table 1 were mixed with Zr and then melted to form an ingot.

Forging was performed in the β phase range of 1100° C. in order that the dendrite structures in the ingot were broken.

Subsequently, solution heat-treatment was conducted at β phase range of 1050° C. and then it was cooled from β phase range to below 400° C. at a cooling rate greater than 300° C./s so that alloy elements were homogeneously distributed and martensite or widmanstatten structure could be obtained.

The β-quenched ingot was hot-worked at 630° C. to yield an extruded shell, suitable for cold working after being worked into hollow billet. The got-worked ingot was heat-treated at 580° C. for 3 hours.

The extruded bar was cold-worked in four passes to prepare nuclear fuel rod cladding tube of final size, 9.5 mm of outside diameter and 0.57 mm of thickness. The intermediate heat-treatment is performed in vacuum between each pass. To measure the corrosion resistant according to the variation of type and size of precipitates and Nb concentration in the α-Zr matrix, intermediate annealing is performed at a temperature of 580° C. and 620° C., respectively. In each step, wherein the intermediate annealing time is 10 hours for each step, 30 hours in total.

On the other hand, increasing manufacturing efficiency, the extruded bar is cold-worked only in three passes to prepare final size of nuclear fuel rod cladding tube. Intermediate annealing is performed at temperature of 580° C. so that the Nb concentration in the α-Zr matrix maintains equilibrium concentration, wherein the intermediate annealing time is 5 hours for each step and 10 hours in total.

The final annealing for the tube with final size is performed in vacuum at 470–580° C. for 3 hour to prepare zirconium-based alloy for use in nuclear fuel rod cladding tubes.

TABLE 1

| Experimental alloy | Nb (wt %) | Sn (wt %) | Fe (wt %) | Cr (wt %) | Cu (wt %) | O (ppm) | Si (ppm) | Zr and impurity |
|---|---|---|---|---|---|---|---|---|
| 1 | 1.12 | — | — | — | — | 1200 | 110 | bal. |
| 2 | 1.25 | — | — | — | — | 1400 | 100 | bal. |
| 3 | 1.32 | — | — | — | — | 1300 | 100 | bal. |
| 4 | 1.51 | — | — | — | — | 1400 | 90 | bal. |
| 5 | 1.68 | — | — | — | — | 1200 | 100 | bal. |
| 6 | 1.35 | — | — | — | 0.02 | 1500 | 90 | bal. |
| 7 | 1.49 | — | — | — | 0.14 | 1400 | 110 | bal. |
| 8 | 1.52 | — | — | — | 0.11 | 1400 | 110 | bal. |
| 9 | 1.59 | — | — | — | 0.12 | 1200 | 100 | bal. |
| 10 | 1.62 | — | — | — | 0.09 | 1200 | 110 | bal. |
| 11 | 1.39 | 0.45 | — | — | — | 800 | 110 | bal. |
| 12 | 1.42 | 0.25 | — | — | — | 1000 | 100 | bal. |
| 13 | 1.51 | 0.41 | — | — | — | 1000 | 110 | bal. |
| 14 | 1.57 | 0.52 | — | — | — | 1400 | 90 | bal. |
| 15 | 1.66 | 0.62 | — | — | — | 1300 | 120 | bal. |
| 16 | 1.15 | 0.37 | 0.05 | — | — | 900 | 120 | bal. |
| 17 | 1.29 | 0.32 | 0.11 | — | — | 1200 | 90 | bal. |
| 18 | 1.50 | 0.43 | 0.12 | — | — | 1000 | 110 | bal. |
| 19 | 1.57 | 0.49 | 0.23 | — | — | 1100 | 110 | bal. |
| 20 | 1.62 | 0.61 | 0.35 | — | — | 1100 | 100 | bal. |
| 21 | 1.11 | 0.31 | 0.09 | 0.06 | — | 1000 | 100 | bal. |
| 22 | 1.28 | 0.40 | 0.12 | 0.10 | — | 900 | 80 | bal. |
| 23 | 1.51 | 0.49 | 0.22 | 0.12 | — | 800 | 90 | bal. |
| 24 | 1.59 | 0.59 | 0.29 | 0.14 | — | 1000 | 110 | bal. |
| 25 | 1.62 | 0.32 | 0.37 | 0.16 | — | 1100 | 100 | bal. |
| 26 | 1.14 | 0.33 | 0.06 | — | 0.05 | 1500 | 120 | bal. |
| 27 | 1.30 | 0.32 | 0.21 | — | 0.11 | 1300 | 110 | bal. |
| 28 | 1.55 | 0.40 | 0.23 | — | 0.10 | 1100 | 90 | bal. |
| 29 | 1.61 | 0.57 | 0.29 | — | 0.09 | 1100 | 90 | bal. |
| 30 | 1.69 | 0.61 | 0.33 | — | 0.15 | 1200 | 120 | bal. |

EXPERIMENTAL EXAMPLE 1

Corrosion Test

To investigate corrosion resistance of alloys prepared in the examples, corrosion tests were performed in three conditions, water (18.9 MPa) of 360° C., steam atmosphere (10.3 Mpa) of 400° C. and 70 ppm LiOH aqueous solution of 360° C. for 150 days in autoclave.

For the experimental alloys in table 2, cold-working was performed for four times and intermediate annealing was performed at 580° C. and 620° C., respectively between each cold-working step and final annealing was performed at 520° C. The Zircaloy-4, a commercial nuclear fuel cladding, was used as a comparative example.

TABLE 2

| | Weight gain after corrosion test for 150 days | | | | | |
|---|---|---|---|---|---|---|
| | 360° C. water | | 400° C. steam | | 360° C. 70 ppm LiOH | |
| Experimental alloy | Intermediate annealing at 580° C. | Intermediate annealing at 620° C. | Intermediate annealing at 580° C. | Intermediate annealing at 620° C. | Intermediate annealing at 580° C. | Intermediate annealing at 620° C. |
| 1 | 48 | 55 | 99 | 106 | 49 | 57 |
| 2 | 45 | 53 | 102 | 110 | 48 | 55 |
| 3 | 48 | 55 | 101 | 108 | 48 | 56 |
| 4 | 49 | 57 | 105 | 112 | 45 | 52 |
| 5 | 49 | 56 | 104 | 112 | 49 | 57 |
| 6 | 51 | 58 | 95 | 102 | 45 | 53 |
| 7 | 46 | 44 | 101 | 109 | 49 | 56 |
| 8 | 45 | 52 | 97 | 104 | 52 | 60 |
| 9 | 49 | 57 | 103 | 111 | 51 | 58 |
| 10 | 49 | 58 | 102 | 109 | 47 | 55 |
| 11 | 59 | 60 | 102 | 110 | 55 | 63 |
| 12 | 51 | 59 | 97 | 105 | 51 | 58 |
| 13 | 52 | 59 | 96 | 103 | 53 | 61 |
| 14 | 49 | 56 | 96 | 104 | 50 | 57 |
| 15 | 50 | 58 | 98 | 106 | 51 | 58 |
| 16 | 46 | 53 | 101 | 108 | 48 | 56 |
| 17 | 53 | 61 | 99 | 107 | 54 | 61 |
| 18 | 45 | 52 | 98 | 106 | 45 | 53 |
| 19 | 48 | 56 | 104 | 111 | 49 | 56 |
| 20 | 52 | 59 | 106 | 103 | 51 | 58 |
| 21 | 47 | 54 | 97 | 104 | 49 | 57 |
| 22 | 49 | 57 | 95 | 103 | 52 | 59 |
| 23 | 46 | 53 | 95 | 102 | 47 | 55 |
| 24 | 47 | 55 | 101 | 109 | 49 | 57 |
| 25 | 54 | 61 | 98 | 106 | 55 | 62 |
| 26 | 46 | 53 | 93 | 110 | 46 | 54 |
| 27 | 49 | 57 | 93 | 111 | 48 | 55 |
| 28 | 45 | 52 | 91 | 98 | 49 | 57 |
| 29 | 46 | 54 | 91 | 99 | 51 | 59 |
| 30 | 46 | 53 | 94 | 111 | 49 | 57 |
| Zircaloy-4 | 58 | | 114 | | 65 | |

From the results of table 2, zirconium-based alloys of the present invention displayed a significantly slighter increase in weight and a higher corrosion resistance than the Zircaloy-4. The zirconium-based alloys, wherein intermediate annealing was performed at 580° C., displayed higher corrosion resistance than the zirconium-based alloy wherein intermediate annealing was performed at 620° C.

On the other hand, zirconium-based alloys cold-worked for three times and intermediate-annealed at 580° C. for 10 hours displayed similar corrosion resistance to that cold-worked for four times and intermediate-annealed at 580° C. for 30 hours. Intermediate annealing time to obtain excellent microstructure could be decreased by increasing the degree of cold working.

EXPERIMENTAL EXAMPLE 2

Observation of Microstructure of Alloys

The experimental alloys 3, 8, 13, 18, 23 and 28 were subjected to cold-working for four times and intermediate annealing at 580° C. and 620° C., respectively. The microstructure of the obtained experimental alloys was observed by a transmission electron microscope.

Figure 1A:
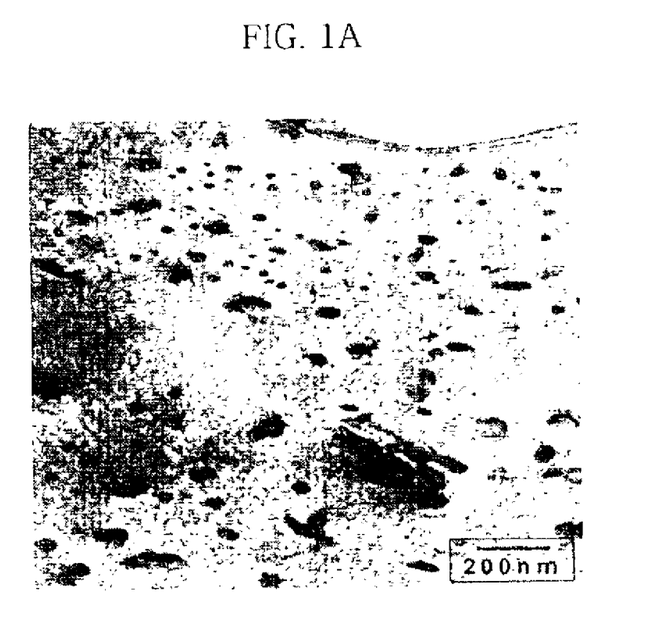
FIGS. 1A and 1B are photomicrographs showing the microstructure of an experimental alloy 28 subjected to intermediate vacuum annealing at 580° C. and 620° C., respectively.
Figure 1B:
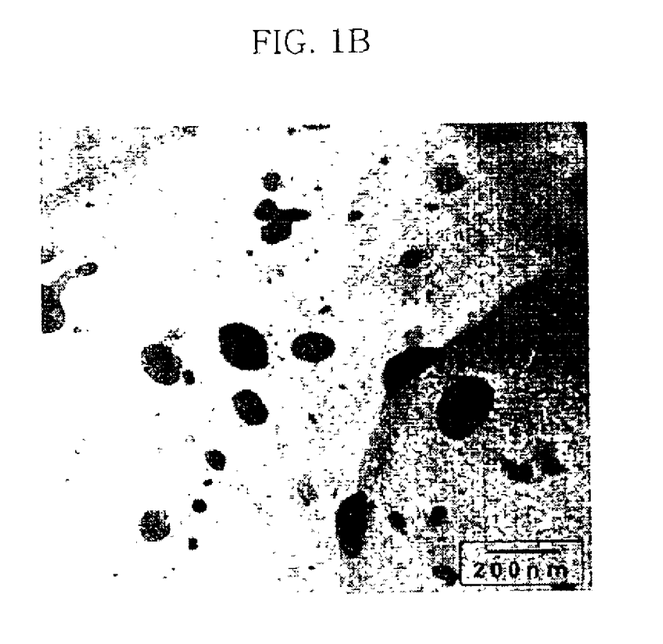

FIGS. 1A and 1B are photomicrographs showing the microstructure of the experimental alloy 28. Results of type and size of precipitates in experimental alloys 3, 8, 12, 18, 23 and 28 are shown in the following table 3.

As shown in FIG. 1A and FIG. 1B, it is shown that the phase of precipitates are uniformly, intragranularly and intergranularly distributed in the alloy matrix even though the intermediate annealing temperature is different.

TABLE 3

| Experimental Alloy | Intermediate annealing at 580° C. | | Intermediate annealing at 620° C. | |
|---|---|---|---|---|
| | Type of precipitate | Average diameter of precipitate (nm) | Type of precipitate | Average diameter of precipitate (nm) |
| 3 | β-Nb, $Zr_2Fe$, $Zr_3Fe$ | 50 | β-Zr, $Zr_2Fe$, $Zr_3Fe$ | 100 |
| 8 | β-Nb, $Zr(Fe, Cu)_2$ | 70 | β-Zr, $Zr(Fe, Cu)_2$ | 120 |
| 13 | β-Nb, $Zr_2Fe$, $Zr_3Fe$ | 62 | β-Zr, $Zr_2Fe$, $Zr_3Fe$ | 104 |
| 18 | β-Nb, $Zr_2Fe$, $Zr_3Fe$ | 72 | β-Zr, $Zr_2Fe$, $Zr_3Fe$ | 121 |
| 23 | β-Nb, $Zr(Fe, Cr)_2$ | 79 | β-Zr, $Zr(Fe, Cr)_2$ | 149 |
| 28 | β-Nb, $Zr(Fe, Cu)_2$ | 77 | β-Zr, $Zr(Fe, Cu)_2$ | 136 |

As shown in table 3, β-Nb is precipitated in the experimental alloy intermediate-annealed at 580° C., whereas β-Zr is precipitated in the experimental alloy intermediate-annealed at 620° C. The average diameter of precipitates is 50–80 nm for alloys intermediate-annealed at 580° C. and 100–140 nm for alloys intermediate-annealed at 620° C. The obtained zirconium-based alloys containing niobium exhibits improved corrosion resistance when β-Nb was formed and the size of precipitates is smaller than 80 nm by intermediate annealing at 580° C.

Figure 2:
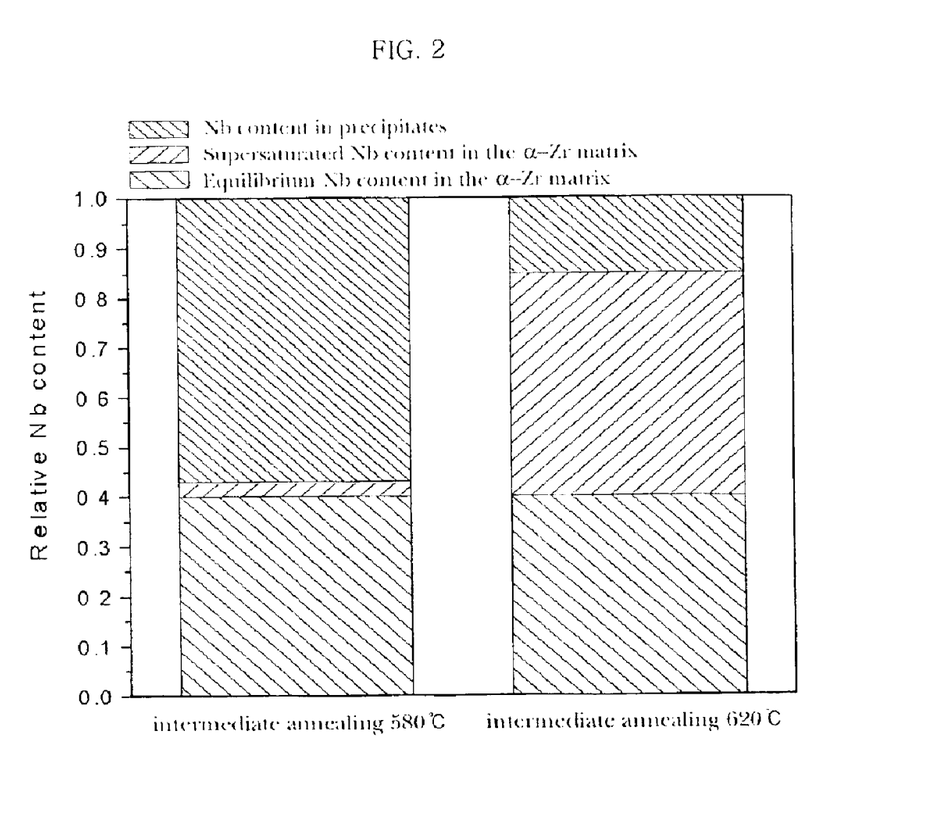
FIG. 2 is a graph illustrating the relation between the relative content of niobium comprising each phase of alloy in the present invention and corrosion resistance.

FIG. 2 is a graph illustrating the relation between the relative content of niobium comprising each phase of alloy in the present invention and corrosion resistance.

Figure 3:
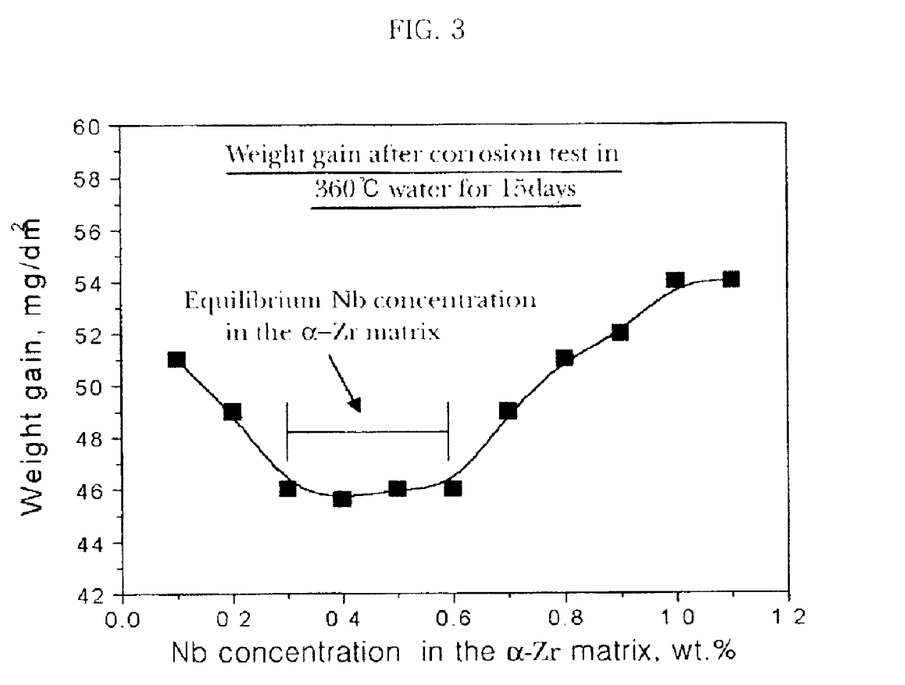
FIG. 3 is a graph illustrating the relation between the content of niobium comprising the $\alpha$-Zr matrix of alloy manufactured according to the present invention and corrosion resistance.

As shown in FIG. 2, β-Nb containing a relatively large quantity of niobium was precipitated in alloy performing intermediate annealing at 580° C. and the niobium concentration in the α-Zr matrix decreased to the level of equilibrium concentration. On the other hand, β-Zr containing a relatively small quantity of niobium was precipitated in alloy intermediate-annealed at 620° C. and the niobium concentration in the α-Zr matrix was supersaturated than the equilibrium concentration. As shown in FIG. 3, when niobium concentration in the α-Zr matrix is 0.3–0.6 wt %, the corrosion resistance of alloy is the highest. The zirconium-based alloy of the present invention exhibits improved corrosion resistance when the concentration of niobium in the α-Zr matrix decreases to the level of equilibrium concentration by intermediate annealing at 580° C.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a niobium-containing zirconium alloy for use in nuclear fuel cladding tubes, wherein the alloy comprises niobium in a range of 1.1–1.7 wt %, oxygen in a range of 600–1600 ppm, silicon in a range of 80–120 ppm, and the balance being zirconium, the method comprising steps of:

melting an ingot of the alloy component;

forging the ingot at a β phase temperature above 1000° C.;

β-quenching the forged ingot in water after performing a solution heat-treatment at β phase range above 1000° C.;

hot-working the β quenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum for a duration of 3–100 hours; and final annealing the cold-worked ingot at a temperature of 470–580° C., whereby the niobium concentration in the alloy decreases from the supersaturation state to the equilibrium state to improve the corrosion resistance of the alloy, wherein the temperature and duration of the intermediate annealing step are such that the β-Nb precipitates in the alloy are limited to a maximum average diameter of 80 nm and an accumulated annealing parameter(ΣA) is limited to a maximum of 1.0×10-18 hours, wherein ΣA=Σ ti exp(−Q/RTi), ti being the annealing time of the i-th step after β-quenching, Ti is the annealing temperature of the i-th step after β-quenching, Q is the activation energy and Q/R is equal to 4000K.

2. The method according to claim 1, wherein the intermediate annealing is performed at 580° C., whereby the niobium concentration in the alloy decreases from the supersaturation state to the level of equilibrium concentration of 0.3–0.6 wt %.

3. The method according to claim 1, wherein the said cold-working is performed in four passes and the intermediate annealing is performed at 580° C. for a duration of 30–100 hours, whereby the niobium concentration in the alloy maintains an equilibrium concentration at the operation temperature of nuclear reactor.

4. The method according to claim 1, wherein the said cold-working is performed in three passes and the intermediate annealing is performed below 580° C. for a duration of 3–10 hours, whereby the degree of cold working and the niobium concentration in the alloy maintains an equilibrium concentration at the operation temperature of nuclear reactor.

5. A method for manufacturing a niobium-containing zirconium alloy for use in nuclear fuel cladding tubes, wherein the alloy comprises niobium in a range of 1.1–1.7 wt %, copper in a range of 0.01–0.15 wt %, oxygen in a range of 600–1600 ppm, silicon in a range of 80–120 ppm, and the balance being zirconium, the method comprising steps of:

melting an ingot of the alloy component;

forging the ingot at a β phase temperature above 1000° C.;

β-quenching the forged ingot in water after performing a solution heat-treatment at β phase range above 1000° C.;

hot-working the β quenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum for a duration of 3–100 hours; and final annealing the cold-worked ingot at a temperature of 470–580° C., whereby the niobium concentration in the alloy decreases from the supersaturation state to the equilibrium state to improve the corrosion resistance of the alloy, wherein the temperature and duration of the intermediate annealing step are such that the β-Nb precipitates in the alloy are limited to a maximum average diameter of 80 nm and an accumulated annealing parameter($\Sigma A$) is limited to a maximum of $1.0 \times 10\text{-}18$ hours, wherein $\Sigma A = \Sigma \, t_i \exp(-Q/RT_i)$, $t_i$ being the annealing time of the i-th step after β-quenching, $T_i$ is the annealing temperature of the i-th step after β-quenching, Q is the activation energy and Q/R is equal to 4000K.

6. The method according to claim 5, wherein the intermediate annealing is performed at 580° C., whereby the niobium concentration in the alloy decreases from the supersaturation state to the level of equilibrium concentration of 0.3–0.6 wt %.

7. The method according to claim 5, wherein the said cold-working is performed in four passes and the intermediate annealing is performed at 580° C. for a duration of 30–100 hours, whereby the niobium concentration in the alloy maintains an equilibrium concentration at the operation temperature of nuclear reactor.

8. The method according to claim 5, wherein the said cold-working is performed in three passes and the intermediate annealing is performed below 580° C. for a duration of 3–10 hours, whereby the degree of cold working and the niobium concentration in the alloy maintains an equilibrium concentration at the operation temperature of nuclear reactor.

9. A method for manufacturing a niobium-containing zirconium alloy for use in nuclear fuel cladding tubes, wherein the alloy comprises niobium in a range of 1.1–1.7 wt %, tin in a range of 0.3–0.7 wt %, oxygen in a range of 600–1600 ppm, silicon in a range of 80–120 ppm, and the balance being zirconium, the method comprising steps of:

melting an ingot of the alloy component;

forging the ingot at a β phase temperature above 1000° C.;

β-quenching the forged ingot in water after performing a solution heat-treatment at β phase range above 1000° C.; hot-working the β quenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum for a duration of 3–100 hours; and final annealing the cold-worked ingot at a temperature of 470–580° C., whereby the niobium concentration in the alloy decreases from the supersaturation state to the equilibrium state to improve the corrosion resistance of the alloy, wherein the temperature and duration of the intermediate annealing step are such that the β-Nb precipitates in the alloy are limited to a maximum average diameter of 80 nm and an accumulated annealing parameter($\Sigma A$) is limited to a maximum of $1.0 \times 10\text{-}18$ hours, wherein $\Sigma A = \Sigma \, t_i \exp(-Q/RT_i)$, $t_i$ being the annealing time of the i-th step after β-quenching, $T_i$ is the annealing temperature of the i-th step after β-quenching, Q is the activation energy and Q/R is equal to 4000K.

10. The method according to claim 9, wherein the intermediate annealing is performed at 580° C., whereby the niobium concentration in the alloy decreases from the supersaturation state to the level of equilibrium concentration of 0.3–0.6 wt %.

11. The method according to claim 9, wherein the said cold-working is performed in four passes and the intermediate annealing is performed at 580° C. for a duration of 30–100 hours, whereby the niobium concentration in the alloy maintains an equilibrium concentration at the operation temperature of nuclear reactor.

12. The method according to claim 9, wherein the said cold-working is performed in three passes and the intermediate annealing is performed below 580° C. for a duration of 3–10 hours, whereby the degree of cold working and the niobium concentration in the alloy maintains an equilibrium concentration at the operation temperature of nuclear reactor.

13. A method for manufacturing a niobium-containing zirconium alloy for use in nuclear fuel cladding tubes, wherein the alloy comprises niobium in a range of 1.1–1.7 wt %, tin in a range of 0.3–0.7 wt %, iron in a range of 0.05–0.4 wt %, oxygen in a range of 600–1600 ppm, silicon in a range of 80–120 ppm, and the balance being zirconium, the method comprising steps of:

melting an ingot of the alloy component;

forging the ingot at a β phase temperature above 1000° C.;

β-quenching the forged ingot in water after performing a solution heat-treatment at β phase range above 1000° C.;

hot-working the β quenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum for a duration of 3–100 hours; and final annealing the cold-worked ingot at a temperature of 470–580° C., whereby the niobium concentration in the alloy decreases from the supersaturation state to the equilibrium state to improve the corrosion resistance of the alloy, wherein the temperature and duration of the intermediate annealing step are such that the β-Nb precipitates in the alloy are limited to a maximum average diameter of 80 nm and an accumulated annealing parameter($\Sigma A$) is limited to a maximum of $1.0 \times 10\text{-}18$ hours, wherein $\Sigma A=\Sigma$ ti exp($-Q/RT_i$), ti being the annealing time of the i-th step after β-quenching, Ti is the annealing temperature of the i-th step after β-quenching, Q is the activation energy and Q/R is equal to 4000K.

14. The method according to claim 13, wherein the intermediate annealing is performed at 580° C., whereby the niobium concentration in the alloy decreases from the supersaturation state to the level of equilibrium concentration of 0.3–0.6 wt %.

15. The method according to claim 13, wherein the said cold-working is performed in four passes and the intermediate annealing is performed at 580° C. for a duration of 30–100 hours, whereby the niobium concentration in the alloy maintains an equilibrium concentration at the operation temperature of nuclear reactor.

16. The method according to claim 13, wherein the said cold-working is performed in three passes and the intermediate annealing is performed below 580° C. for a duration of 3–10 hours, whereby the degree of cold working and the niobium concentration in the alloy maintains an equilibrium concentration at the operation temperature of nuclear reactor.

17. A method for manufacturing a niobium-containing zirconium alloy for use in nuclear fuel cladding tubes, wherein the alloy comprises niobium in a range of 1.1–1.7 wt %, tin in a range of 0.3–0.7 wt %, iron in a range of 0.05–0.4 wt %, chromium in a range of 0.05–0.2 wt %, oxygen in a range of 600–1600 ppm, silicon in a range of 80–120 ppm, and the balance being zirconium, the method comprising steps of:

melting an ingot of the alloy component;

forging the ingot at a β phase temperature above 1000° C.;

β-quenching the forged ingot in water after performing a solution heat-treatment at β phase range above 1000° C.;

hot-working the βquenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum for a duration of 3–100 hours; and final annealing the cold-worked ingot at a temperature of 470–580° C., whereby the niobium concentration in the alloy decreases from the supersaturation state to the equilibrium state to improve the corrosion resistance of the alloy, wherein the temperature and duration of the intermediate annealing step are such that the β-Nb precipitates in the alloy are limited to a maximum average diameter of 80 nm and an accumulated annealing parameter($\Sigma A$) is limited to a maximum of 1.0×10-18 hours, wherein $\Sigma A=\Sigma$ ti exp($-Q/RT_i$), ti being the annealing time of the i-th step after β-quenching, Ti is the annealing temperature of the i-th step after β-quenching, Q is the activation energy and Q/R is equal to 4000K.

18. The method according to claim 17, wherein the intermediate annealing is performed at 580° C., whereby the niobium concentration in the alloy decreases from the supersaturation state to the level of equilibrium concentration of 0.3–0.6 wt %.

19. The method according to claim 17, wherein the said cold-working is performed in four passes and the intermediate annealing is performed at 580° C. for a duration of 30–100 hours, whereby the niobium concentration in the alloy maintains an equilibrium concentration at the operation temperature of nuclear reactor.

20. The method according to claim 17, wherein the said cold-working is performed in three passes and the intermediate annealing is performed below 580° C. for a duration of 3–10 hours, whereby the degree of cold working and the niobium concentration in the alloy maintains an equilibrium concentration at the operation temperature of nuclear reactor.

21. A method for manufacturing a niobium-containing zirconium alloy for use in nuclear fuel cladding tubes, wherein the alloy comprises niobium in a range of 1.1–1.7 wt %, tin in a range of 0.3–0.7 wt %, iron in a range of 0.05–0.4 wt %, copper in a range of 0.05–0.2 wt %, oxygen in a range of 600–1600 ppm, silicon in a range of 80–120 ppm, and the balance being zirconium, the method comprising steps of:

melting an ingot of the alloy component;

forging the ingot at a β phase temperature above 1000° C.;

β-quenching the forged ingot in water after performing a solution heat-treatment at β phase range above 1000° C.;

hot-working the β quenched ingot at a temperature of 600–640° C.;

vacuum annealing the hot-worked ingot at 570–610° C.;

cold-working the annealed ingot in three to four passes, with an intermediate annealing step performed between each pass, wherein the intermediate annealing step is performed at a temperature of 570–610° C. in a vacuum for a duration of 3–100 hours; and final annealing the cold-worked ingot at a temperature of 470–580° C., whereby the niobium concentration in the alloy decreases from the supersaturation state to the equilibrium state to improve the corrosion resistance of the alloy, wherein the temperature and duration of the intermediate annealing step are such that the β-Nb precipitates in the alloy are limited to a maximum average diameter(of 80 nm and an accumulated annealing parameter($\Sigma A$) is limited to a maximum of 1.0×10-18 hours, wherein $\Sigma A=\Sigma$ ti exp($-Q/RT_i$), ti being the annealing time of the i-th step after β-quenching, Ti is the annealing temperature of the i-th step after β-quenching, Q is the activation energy and Q/R is equal to 4000K.

22. The method according to claim 21, wherein the intermediate annealing is performed at 580° C., whereby the niobium concentration in the alloy decreases from the supersaturation state to the level of equilibrium concentration of 0.3–0.6 wt %.

23. The method according to claim 21, wherein the said cold-working is performed in four passes and the intermediate annealing is performed at 580° C. for a duration of 30–100 hours, whereby the niobium concentration in the alloy maintains an equilibrium concentration at the operation temperature of nuclear reactor.

24. The method according to claim 21, wherein the said cold-working is performed in three passes and the intermediate annealing is performed below 580° C. for a duration of 3–10 hours, whereby the degree of cold working and the niobium concentration in the alloy maintains an equilibrium concentration at the operation temperature of nuclear reactor.

* * * * *